(12) United States Patent
Cheon et al.

(10) Patent No.: US 8,066,969 B2
(45) Date of Patent: Nov. 29, 2011

(54) PREPARATION METHOD OF MAGNETIC AND METAL OXIDE NANOPARTICLES

(75) Inventors: Jin-Woo Cheon, Seoul (KR); Jung-Wook Seo, Seoul (KR); Jae-Hyun Lee, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 757 days.

(21) Appl. No.: 10/598,480

(22) PCT Filed: Nov. 26, 2004

(86) PCT No.: PCT/KR2004/003088
§ 371 (c)(1),
(2), (4) Date: Jul. 6, 2007

(87) PCT Pub. No.: WO2006/052042
PCT Pub. Date: May 18, 2006

(65) Prior Publication Data
US 2008/0003159 A1    Jan. 3, 2008

(30) Foreign Application Priority Data

Nov. 10, 2004    (KR) .................. 10-2004-0091240

(51) Int. Cl.
| | | |
|---|---|---|
| C01B 13/14 | (2006.01) |
| C01B 13/00 | (2006.01) |
| C01C 1/00 | (2006.01) |
| C01D 1/02 | (2006.01) |
| C01G 49/00 | (2006.01) |
| C01G 51/04 | (2006.01) |
| C01G 37/14 | (2006.01) |
| C01G 9/02 | (2006.01) |
| C01G 11/02 | (2006.01) |
| C01G 13/02 | (2006.01) |
| C01G 3/02 | (2006.01) |
| C01G 5/00 | (2006.01) |
| C01G 7/00 | (2006.01) |
| C01G 45/02 | (2006.01) |
| C01G 47/00 | (2006.01) |
| C01G 99/00 | (2010.01) |
| C01G 37/02 | (2006.01) |
| C01G 49/02 | (2006.01) |
| C01G 51/02 | (2006.01) |
| C01G 53/04 | (2006.01) |

(52) U.S. Cl. ............... 423/592.1; 423/593.1; 423/594.1; 423/594.5; 423/595; 423/594.14; 423/604; 423/605; 423/607; 423/622; 423/632; 423/633; 423/594.19; 977/773; 977/775; 977/776

(58) Field of Classification Search ....... 423/592.1–643; 502/300–355; 977/773, 775–777
See application file for complete search history.

(56) References Cited

U.S. PATENT DOCUMENTS 6,572,673 B2 *  6/2003  Lee et al. ..................... 75/362

(Continued)

FOREIGN PATENT DOCUMENTS

EP     0977212     7/1999

(Continued)

OTHER PUBLICATIONS

Masala et al. "Synthesis Routes for Large Volumes of Nanoparticles", Annu. Rev. Mater. Res. 2004. 34:41-81.*

(Continued)

*Primary Examiner* — Stanley Silverman
*Assistant Examiner* — Anthony J Zimmer
(74) *Attorney, Agent, or Firm* — Holme Roberts & Owen LLP

(57) ABSTRACT

This invention relates, in general, to a method of producing magnetic oxide nanoparticles or metal oxide nanoparticles and, more particularly, to a method of producing magnetic or metal oxide nanoparticles, which comprises (1) adding a magnetic or metal precursor to a surfactant or a solvent containing the surfactant to produce a mixed solution, (2) heating the mixed solution to 50-6001 C to decompose the magnetic or metal precursor by heating so as to form the magnetic or metal oxide nanoparticles, and (3) separating the magnetic or metal oxide nanoparticles. Since the method is achieved through a simple process without using an oxidizing agent or a reducing agent, it is possible to simply mass-produce uniform magnetic or metal oxide nanoparticles having desired sizes compared to the conventional method.

27 Claims, 19 Drawing Sheets

U.S. PATENT DOCUMENTS

| | | | |
|---|---|---|---|
| 6,984,369 B1 * | 1/2006 | Alivisatos et al. | 423/592.1 |
| 7,393,518 B2 * | 7/2008 | Chiang et al. | 423/608 |
| 2004/0115124 A1 | 6/2004 | Woo et al. | |
| 2004/0253174 A1 * | 12/2004 | Williams | 423/608 |
| 2005/0191231 A1 * | 9/2005 | Sun | 423/632 |
| 2005/0214190 A1 * | 9/2005 | Hyeon et al. | 423/299 |
| 2006/0245998 A1 * | 11/2006 | Kahn et al. | 423/592.1 |

FOREIGN PATENT DOCUMENTS

| | | |
|---|---|---|
| EP | 00977212 | 2/2000 |
| KR | 10-2004-0029871 | 4/2004 |
| WO | WO 03/031323 | 4/2003 |
| WO | WO 03/053851 | 7/2003 |
| WO | 2006/025627 | 3/2006 |

OTHER PUBLICATIONS

O'Brien et al. "Synthesis of Monodisperse Nanoparticles of Barium Titanate: Toward a Generalized Strategy of Oxide Nanoparticle Synthesis", Journal of the American Chemical Society 2001, 123, 12085-12086.*

Rajamathi et al. "Oxide and chalcogenide nanoparticles from hydrothermal/solvothermal reactions", Current Opinion in Solid State and Materials Science 6 (2002) 337-345.*

Sanchez et al. "Designed Hybrid Organic-Inorganic Nanocomposites from Functional Nanobuilding Blocks", Chem. Mater. 2001, 3061-3083.*

Cushing et al. "Recent Advances in the Liquid-Phase Synthesis of Inorganic Nanoparticles", Chem. Rev. 2004, 104, 3893-3946.*

Sun et al. "Size-Controlled Synthesis of Magnetite Nanoparticles", Journal of the American Chermical Society 2002, 124, 8204-8205.*

International Search Report dated Aug. 8, 2005, for PCT Application No. PCT/KR2004/003088.

Written Opinion dated Aug. 8, 2005, for PCT Application No. PCT/KR2004/003088.

P. Deb et al. "Characteristics of Fe2O3 nanoparticles prepared by heat treatment of a nonaqueous powder precipitate" J. of Nanoparticle Research, 2002, 4:91-97, 2002, Kluwer Academic Publishers, The Netherlands.

J. Rochenberger et al. "A New Nonhydrolytic Single-Precursor Approach to Surfactant-Capped Nanocrystals of Transition Metal Oxides" J. Am. Chem. Soc. 1999, 121, pp. 11595-11596, American Chemical Society.

Y. Jun et al. "Surfactant-Assisted Elimination of a High Energy Facet as a Means of Controlling the Shapes of TiO2 Nanocrystals" J. Am. Chem. Soc. 2003, 125, pp. 15981-15985, American Chemical Society.

Kurihara, L.K. et al. "Nanocrystalline Metallic Powders and Films Produces by the Polyol Method" NanoStructured Materials, vol. 5, No. 6, pp. 607-613, 1995, Elsevier Science Ltd., USA.

* cited by examiner

PREPARATION METHOD OF MAGNETIC AND METAL OXIDE NANOPARTICLES

TECHNICAL FIELD

The present invention relates, in general, to a method of producing magnetic oxide nanoparticles or metal oxide nanoparticles and, more particularly, to a method of producing magnetic or metal oxide nanoparticles, which comprises (1) adding a magnetic or metal precursor to a surfactant or a solvent containing the surfactant to produce a mixed solution, (2) heating the mixed solution to 50-600° C. to decompose the magnetic or metal precursor by heating so as to form the magnetic or metal oxide nanoparticles, and (3) separating the magnetic or metal oxide nanoparticles.

BACKGROUND ART

It is known that magnetic, electric, and optical properties of metal oxide nanoparticles depend on their size and shape (Dai, Z. R. Adv. Func. Mater. 2003, vol. 19, p. 9). Based on the above characteristics, it is predicted that the metal oxide nanoparticles are capable of being applied to various fields, such as magnetic resonance imaging contrast media, record storage media, catalysts, energy storage, sensors, and ferrofluid (Zarur, A. J. Nature, 2000, vol. 403, p. 65; Majetich, S. A. Science, 1999, vol. 284, p. 470).

Nanoparticles have been produced through various synthesis methods, which include thermal decomposition of an organometallic precursor, decomposition using an ultrasonic method, reduction of metal ions at high temperatures, or reduction in inverse micelles. Of them, the most frequently used method is one in which a solution containing surfactants is heated to a high temperature, a precursor is added thereto for a short time to form uniform crystalline nuclei, and the temperature is reduced so as to prevent the formation of additional nuclei and to make the growth of the particles uniform. Additionally, various related technologies have been developed.

Korean Pat. Laid-Open Publication No. 2003-0082395 discloses a method of synthesizing uniform spherical metal oxide nanoparticles, in which a metal precursor and a surfactant react in a solvent at 30-200° C. to produce a metal-surfactant complex where the surfactant is bonded to the metal, the metal-surfactant complex is decomposed at 50-500° C. by heating to synthesize uniform spherical metal nanoparticles, and the synthesized spherical metal nanoparticles are separated and then oxidized using an oxidizing agent.

Korean Pat. Laid Open Publication No. 2003-008234, U.S. Pat. No. 6,262,129, and Shouheng Sun, J. Am. Chem. Soc., 2002, vol. 124, p. 8204 disclose a method of producing a magnetite ($Fe_3O_4$) nanoparticle material, in which iron salts, alcohol, organic acid, and organic amine are mixed and heated at 200-360° C. In the above method, the particle size is controlled by changing a ratio of iron salts to acid/amine or by coating small nanoparticles with additional iron oxide.

Another conventional technology is a method of producing metal or magnetic nanoparticles, in which, after a metal precursor is synthesized, the precursor is rapidly added to a hot solution where a surfactant is mixed with a solvent (Peng, X. Chem. Mater. 2004, vol. 16, p. 3931).

Meanwhile, synthesizing methods, which aim to control the shape and the size of metal oxide nanoparticles, are known.

For example, a method of producing metal oxide nanoparticles having various shapes, such as sphere, rod, or bullet shapes, is suggested, in which a solution, containing metal, alkoxide, and a surfactant, is heated, and then a metal halogen compound is rapidly added thereto at high temperatures to produce the nanoparticles in a kinetically stable state while the type and the concentration of the surfactant are controlled (Cheon, J. Am. Chem. Soc. 2003, vol. 125, p. 15981).

Another example is a method of producing anisotropic metal oxide nanoparticles at high temperatures by mixing a metal precursor with a surfactant, a solvent, and an oxidizing agent (Park, J. T., J. Am. Chem. Soc. 2003, vol. 125, p. 3408).

However, the production of the metal oxide nanoparticles according to the above methods has the following problems. In Korean Pat. Laid-Open Publication No. 2003-0082395 and Park, J. T. J. Am. Chem. Soc. 2003, vol. 125, p. 3408, it is necessary to conduct an oxidation process of converting the metal nanoparticles into the metal oxide nanoparticles using an oxidizing agent after the metal nanoparticles have been produced. The above two patents are problematic in that reaction efficiency is reduced because a production procedure is complicated due to the two-step process as described above, and a production cost of the oxide nanoparticles is increased because many types of reactant are added U.S. Pat. No. 6,262,129, Korean Pat. Laid-Open Publication No. 2003-0082394, and Shouheng Sun, J. Am. Chem. Soc., 2002, vol. 124, p. 8204 have a disadvantage in that since it is possible to produce the nanoparticles only when using all of three reactants comprising polyalcohol as a reducing agent, organic acid, and organic amine, many types of reactant are used. Particularly, in the course of producing ferrite magnetic oxide containing manganese or cobalt, the oxidation number of iron is 3, and the oxidation numbers of manganese and cobalt are both 2. However, if polyalcohol acting as the reducing agent reduces iron, it is impossible to form ferrite nanoparticles, and chemical equivalence ratios of metals are not in accord with each other, thus the structure of the nanoparticle does not coincide with an inverse spinel structure. Furthermore, due to polyaldehyde and polyorganic acid, caused by a side reaction of polyalcohol as the reducing agent, the action of organic acid as the surfactant is suppressed and a process of separating byproducts is complicated. Peng, X., Chem. Mater. 2004, vol. 16, p. 3931 discloses a method in which after the metal precursor has been synthesized and purified, the metal precursor is rapidly injected to a reaction solution. In the method, since a complicated process of synthesizing and purifying the meal precursor must be implemented and reactants are mixed by rapid injection, it is difficult to synthesize uniform nanoparticles in great quantity. Likewise, Cheon, J. Am. Chem. Soc. 2003, vol. 125 p. 15981 is problematic in that since the metal precursor is rapidly injected into the reaction solution at high temperatures to produce the anisotropic metal oxide nanoparticles, it is difficult to produce the uniform nanoparticles in great quantity, and a complicated process must be conducted in order to precisely control the reaction.

Therefore, the present inventors have conducted extensive studies, resulting in the findings that it is possible to produce magnetic or metal oxide nanoparticles through a single process by mixing a metal precursor, a solvent and a surfactant while heating them without an oxidizing or reducing agent, and that it is possible to produce magnetic or metal oxide nanoparticles having a desired size by controlling the concentration of the precursor or the type of the surfactant, thereby accomplishing the present invention.

DISCLOSURE OF THE INVENTION

Accordingly, an object of the present invention is to provide a method of effectively mass-producing magnetic or metal oxide nanoparticles having a desired size and a uniform shape through a simple without using an oxidizing agent or a reducing agent.

In order to accomplish the above object, the present invention provides a method of producing magnetic or metal oxide nanoparticles. The method comprise (1) adding a magnetic or metal precursor to a surfactant or a solvent containing the surfactant to produce a mixed solution, (2) heating the mixed solution to 50-600° C. to decompose the magnetic or metal precursor by heating so as to form the magnetic or metal oxide nanoparticles, and (3) separating the magnetic or metal oxide nanoparticles.

BEST MODE FOR CARRYING OUT THE INVENTION

Figure 1:
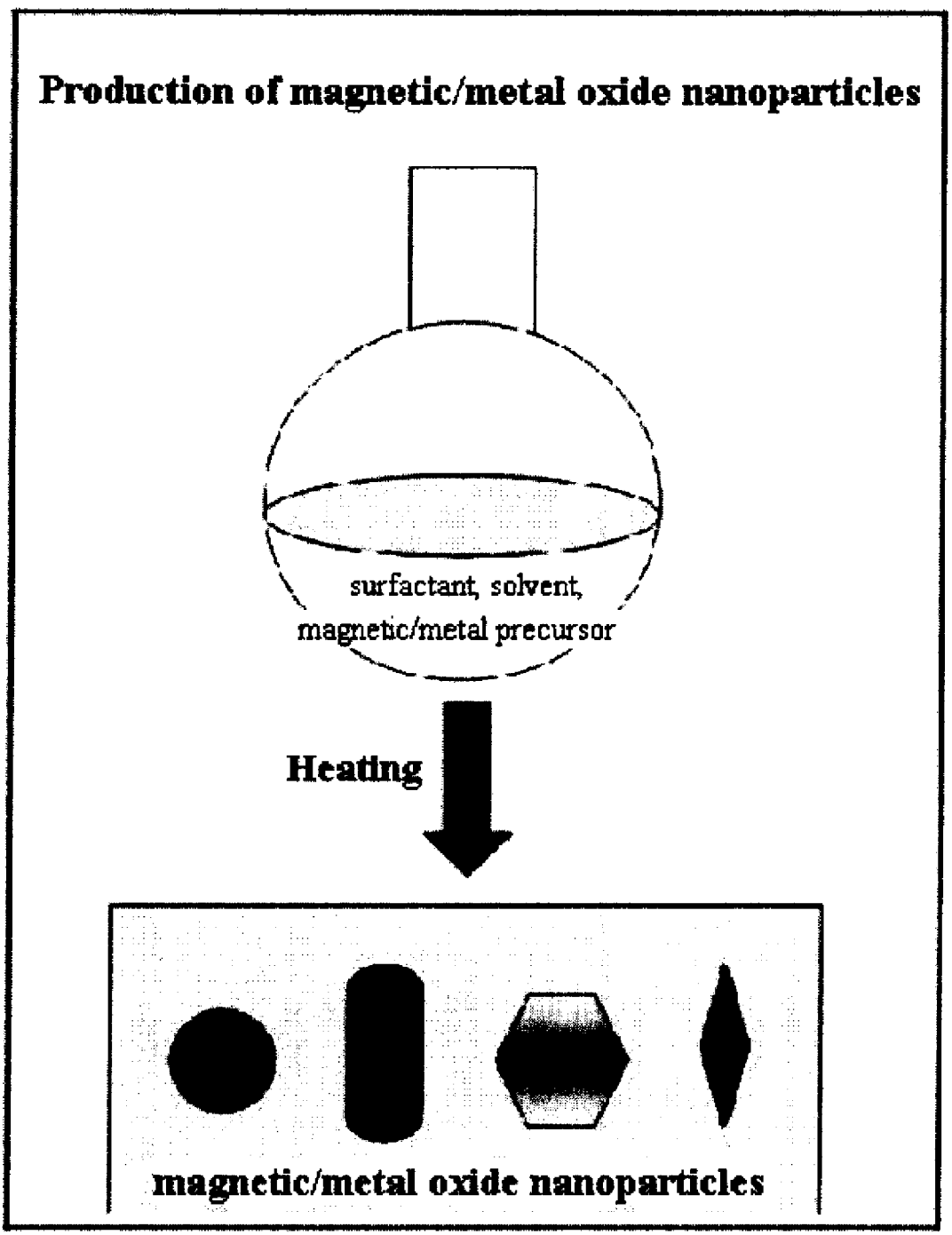
FIG. 1 illustrates the production of magnetic oxide nanoparticles or metal oxide nanoparticles according to the present invention.

The present invention relates to a method of producing magnetic oxide nanoparticles or metal oxide nanoparticles. The method comprises (1) adding a magnetic or metal precursor to a surfactant or a solvent containing the surfactant to produce a mixed solution, (2) heating the mixed solution to 50-600° C. to decompose the magnetic or metal precursor by heating so as to form the magnetic or metal oxide nanoparticles, and (3) separating the magnetic or metal oxide nanoparticles.

Hereinafter, a detailed description will be given of the magnetic precursor, the metal precursor, the surfactant, and the solvent that are used as reactants in the method according to the present invention.

In the present invention, examples of the "magnetic precursor" include metal a nitrate based compound, a metal sulfate-based compound, a metal fluoroacetoacetate compound, a metal halide-based compound ($MX_a$, M=Fe, Ni, Co, Gd, Mn, Zn, Cr, or Cu, X=F, Cl, Br, or I, $0<a\leqq5$), a metal perchlorate-based compound, a metal sulfamate-based compound, a metal stearate-based compound, or an organometallic compound.

The metal nitrate-based compound is exemplified by iron (II) nitrate, iron(III) nitrate, manganese nitrate, cobalt nitrate, zinc nitrate, nickel nitrate, and copper nitrate.

The metal sulfate-based compound is exemplified by iron sulfite (II), iron sulfate (III), manganese sulfate, cobalt sulfate, nickel sulfate, copper sulfate, and zinc sulfate.

The metal fluoroacetoacetate-based compound is exemplified by iron trifluoroacetoacetate, cobalt hexafluoroacetoacetate, manganese hexafluoroacetoacetate, nickel hexafluoroacetoacetate, copper hexafluoroacetoacetate, and zinc hexafluoroacetoacetate.

The metal halide-based compound is exemplified by iron (II) chloride, iron(III) chloride, cobalt chloride, nickel chloride, copper chloride, zinc chloride, gadolinium chloride, iron(II) bromide, iron(III) bromide, cobalt bromide, nickel bromide, copper bromide, zinc bromide, iron(II) iodide, iron (III) iodide, manganese iodide, nickel iodide, copper iodide, zinc iodide, and cobalt iodide.

The metal perchlorate-based compound is exemplified by iron(III) perchlorate [$Fe(ClO_4)_3$], cobalt perchlorate [$Co(ClO_4)_2$], manganese perchlorate [$Mn(ClO_4)_2$], nickel perchlorate [$Ni(ClO_4)_2$], copper perchlorate [$Cu(ClO_4)_2$], and zinc perchlorate [$Zn(ClO_4)_2$].

The metal sulfamate-based compound is exemplified by iron sulfamate ($FeNH_2SO_3)_2$, manganese sulfamate ($MnNH_2SO_3)_2$, nickel sulfamate ($NiNH_2SO_3)_2$, cobalt sulfamate ($CoNH_2SO_3)_2$, copper sulfamate ($CuNH_2SO_3)_2$, and zinc sulfamate ($ZnNH_2SO_3)_2$.

The metal stearate-based compound is exemplified by iron stearate [$Fe(O_2C_{18}H_{35})$], manganese stearate [($Mn(O_2C_{18}H_{35})$], nickel stearate [$Ni(O_2C_{18}H_{35})$], copper stearate [$Cu(O_2C_{18}H_{35})$], cobalt stearate [$Co(O_2C_{18}H_{35})$], and zinc stearate [$Zn(O_2C_{18}H_{35})$].

The organometallic compound is exemplified by iron(III) meso tetraphenylporphin-μ-oxo dimer [$(C_{44}H_{28}N_4)Fe]_2O$, tris(2,2,6,6-tetramethyl-3,5-heptanedionate)iron(III) [$Fe(C_{11}H_{19}O_2)_3$; abbreviated as $Fe(TMHD)_3$], bis(2,2,6,6-tetramethyl-3,5-heptanedionate)nickel [$Ni(C_{11}H_{19}O_2)_2$; abbreviated as $Ni(TMHD)_2$], bis(2,6,6,6-tetramethyl-3,5-heptanedionate)cobalt [$Co(C_{11}H_{19}O_2)_2$, abbreviated as $Co(TMHD)_2$], bis(2,2,6,6-tetramethyl-3,5-heptanedionate) copper [$Cu(C_{11}H_{19}O_2)_2$, abbreviated as $Cu(TMHD)_2$], bis(2,2,6,6 tetramethyl-3,5-heptanedionate)zinc [$Zn(C_{11}H_{19}O_2)_2$, abbreviated as $Zn(TMHD)_2$], and bis(2,2,6,6-tetramethyl-3,5-heptanedionate)manganese [$Mn(C_{11}H_{19}O_2)_2$, abbreviated as $Mn(TMHD)_2$].

Illustrative, but non-limiting examples of the "metal precursor" include the metal halide-based compound ($MX_a$, where M=Ti, Zr, Ta, Nb, Mn, Sr, Ba, W, Mo, Sn, or Pb, X=F, Cl, Br, or I, and $0<a\leqq5$). The metal halide-based compound is exemplified by titanium tetrachloride, zirconium tetrachloride, tantalum pentachloride, tin tetrachloride, tungsten chloride, molybdenum tetrachloride, manganese chloride, titanium tetrabromide, zirconium tetrabromide, tantalum pentabromide, tin tetrabromide, and manganese bromide.

In the method of the present invention, the "surfactant" is used to stabilize the magnetic or metal oxide nanoparticles. Examples of such surfactant include organic acid ($C_nCOOH$, $C_n$: hydrocarbon, $7 \leq n \leq 30$), such as oleic acid, lauric acid, steric acid, mysteric acid, or hexadecanoic acid and organic amine ($C_nNH_2$, $C_n$: hydrocarbon, $7 \leq n \leq 30$), such as oleyl amine, lauryl amine, trioctyl amine, dioctyl amine, or hexadecyl amine, alkane thiol ($C_nSH$, $C_n$: hydrocarbon, $7 \leq n \leq 30$), such as dodecane thiol, hexadecane thiol, or heptadecane thiol, phosphonic acid ($C_nPO(OH)_2$, $C_n$: hydrocarbon, $7 \leq n \leq 30$), such as tetradecyl phosphonic acid or octadecyl phosphonic acid, trioctylphosphine oxide, tributylphosphine, alkyl sulfate, alkyl phosphate, and tetraalkylammonium halide.

In the method according to the present invention, it is preferable that the "solvent" have a high boiling point. Illustrative, but non-limiting examples of such solvent include an ether-based compound ($C_{n2}O$, $C_n$: hydrocarbon, $5 \leq n \leq 30$), such as octyl ether, benzyl ether, or phenyl ether, hydrocarbons ($C_nH_m$, $7 \leq n \leq 30$), such as hexadecane, heptadecane, or octadecane, organic acid ($C_nCOOH$, $C_n$: hydrocarbon, $7 \leq n \leq 30$), such as oleic acid, lauric acid, stearic acid, mysteric acid, or hexadecanoic acid and organic amine ($C_nNH_2$, $C_n$: hydrocarbon, $7 \leq n \leq 30$), such as oleyl amine, lauryl amine, trioctyl amine, dioctyl amine, or hexadecyl amine, and alkane thiol ($C_nSH$, $C_n$: hydrocarbon, $7 \leq n \leq 30$), such as dodecane thiol, hexadecane thiol, or heptadecane thiol.

Meanwhile, in the step (1) of the method according to the present invention, the metal or magnetic precursor is added to (i) the surfactant, or (ii) the solvent containing the surfactant to produce the mixed solution. The amount of surfactant in the mixed solution may be 1-100 times, preferably 5-70 times, and more preferably 8-50 times that of the precursor. Furthermore, when the solvent is contained in the mixed solution, the amount of the solvent is 1-100 times, preferably 2-60 times, and more preferably 5-40 times that of the precursor.

In the step (2) of the method according to the present invention, the mixed solution of the step (1) is heated to 50-600° C., preferably 100-450° C., and more preferably 250-400° C. to decompose the magnetic or metal precursor by heating, thereby forming the desired magnetic oxide nanoparticles or metal oxide nanoparticles without an oxidizing agent or a reducing agent. It is preferable that the heating be conduced at 50-600° C. for 30 min-3 hours when the magnetic oxide nanoparticles are to be produced, and that the heating be implemented at 50-600° C. for 1 min-2 hours when the metal oxide nanoparticles are to be produced.

In the step (3) of the method according to the present invention, the magnetic oxide nanoparticles or the metal oxide nanoparticles, which are formed in the step (2), are separated. The nanoparticles may be separated through a method known in the art, and for example, ethanol or acetone is added to the reaction products to precipitate the magnetic or metal oxide articles, and the separation is implemented using a centrifugal separator and a magnet.

According to an aspect of the method of the present invention, one type of magnetic precursor is added to a solvent, which contains a surfactant, to produce a mixed solution, and the mixed solution is heated to synthesize "single component magnetic oxide nanoparticles". Additionally, two or more types of magnetic precursor are added to a solvent which contains a surfactant, to produce a mixed solution, and the mixed solution is heated to synthesize "composite magnetic oxide nanoparticles".

In the above aspect, the size of the magnetic oxide nanoparticle can be controlled by a concentration of the magnetic precursor, and the higher concentration of the precursor the size of the magnetic oxide nanoparticle. The concentration of the precursor can be controlled by the amount of solvent. In detail, the solvent may be added in an amount that is 30-35 times, 15-20 times, or 5-10 times as much as the precursor in order to produce magnetic oxide nanoparticles having sizes of about 6 nm, about 9 nm, or about 12 nm, respectively.

According to another aspect of the method of the present invention, one type of metal precursor is added to a surfactant to produce a mixed solution and the mixed solution is heated to produce "single component metal oxide nanoparticles" having an anisotropic structure. Additionally, two or more types of metal precursor are added to a solvent, which contains a surfactant, to produce a mixed solution, and the mixed solution is heated to synthesize "composite metal oxide nanoparticles".

In the second aspect, the diameter of the metal oxide nanoparticle can be controlled by the surfactant. In detail, the concentration of the surfactants is controlled when one type of surfactant is used, or a composition ratio of the surfactants is controlled when two types of surfactant are used, thereby producing metal oxide nanoparticles having the desired diameter. If the surfactant is composed of organic acid and organic amine, the increased amount of organic acid brings about larger diameter metal oxide nanoparticles. In order to produce the metal oxide nanoparticles which have the desired diameter of the present invention, that is, the diameter of 2-30 nm, a ratio of organic acid/organic amine is set to 1/50-50/1, preferably 1/25-25/1, and more preferably 1/12-12/1.

Through the above method according to the preset invention, it is possible to synthesize single component magnetic oxide nanoparticles, which contain one type of metal component and are expressed by $M_xO_y$ (M=Fe, Ni, Co, Gd, Mn, Zn, Cr, or Cu, $0<x \leq 3$, $0<y \leq 4$), and the composite magnetic oxide nanoparticles, which contain two types of metal components and are expressed by $MM'_2O_4$ (M and M'=Co, Ni, Mn, Zn, Gd, or Cr). However, the present invention is not limited to these magnetic oxide nanoparticles.

Through the above method according to the present invention, it is possible to synthesize single component metal oxide nanoparticles that contain one type of metal component and are expressed by $M_xO_y$ (M=Ti, Zr, Ta, Nb, Mn, Sr, Ba, W, Mo, Sn, or Pb, $0<x \leq 3$, $0<y \leq 5$), and composite metal oxide nanoparticles that contain two types of metal components and are exemplified by $BaTiO_3$, $PbTiO_3$, $ZrTiO_3$, $BaSr_xTi_{1-x}$, $PbZr_xTi_{1-x}O_3$ ($0 \leq x \leq 1$). However, the present invention is not limited to these metal oxide nanoparticles.

Meanwhile, the magnetic oxide nanoparticles or the metal oxide nanoparticles produced through the method of the present invention may be applied to various fields, depending on the type thereof. For example, the magnetic nanoparticles, such as iron oxide nanoparticles, may be applied to magnetic resonance imaging contrast media, data storage, and sensor ferrofluid fields. Titanium oxide nanoparticles may be applied to photocatalyst and sensor fields, tungsten oxide nanoparticles may be used as photocatalysts and desulphurizers, and tungsten compounds having a layered structure may act as precursors and thus be applied to energy storage and sensor fields. Manganese oxide nanoparticles may be used as material for electrodes of high capacity ceramic condensers, as chemical reaction catalysts, and as material for soft magnets.

A better understanding of the ret invention may be obtained through the following examples which are set forth to illustrate, but are not to be construed as the limit of the present invention.

Example 1

Production of Iron Oxide Nanoparticles Having Various Sizes

Iron nitrate (Aldrich) was decomposed by heating in 20 ml of an octyl ether solvent (Aldrich) containing 0.1 M lauric acid (Aldrich) and 0.1 M lauryl amine (Aldrich) at 290° C. for 1 hour to synthesize iron oxide nanoparticles having the size of 6 nm. Furthermore, the procedure of synthesizing the iron oxide nanoparticles having the size of 6 nm was repeated except that the amount of solvent was set to 10 ml, thereby producing iron oxide nanoparticles having the size of 9 nm. Additionally, the procedure of synthesizing the iron oxide nanoparticles having sizes of 6 nm or 9 nm was repeated except that the amount of solvent was set to 5 ml, thereby producing iron oxide nanoparticles having the size of 12 nm.

Figure 2A:
FIGS. 2a, 2b, and 2c are transmission electron microscope (TEM) pictures of iron oxide nanoparticles having sizes of 6, 9, and 12 nm produced according to the present invention.
Figure 2B:
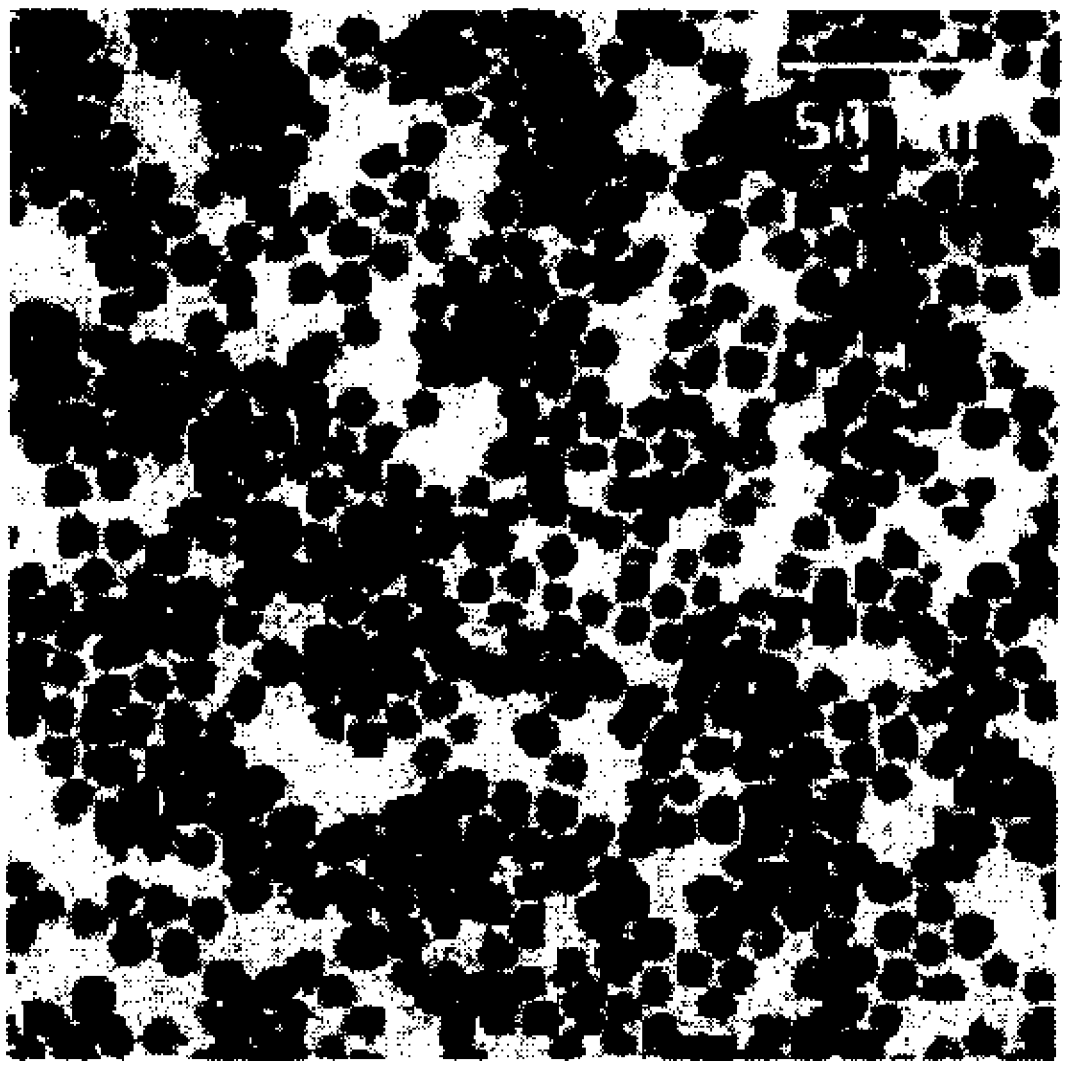
Figure 2C:
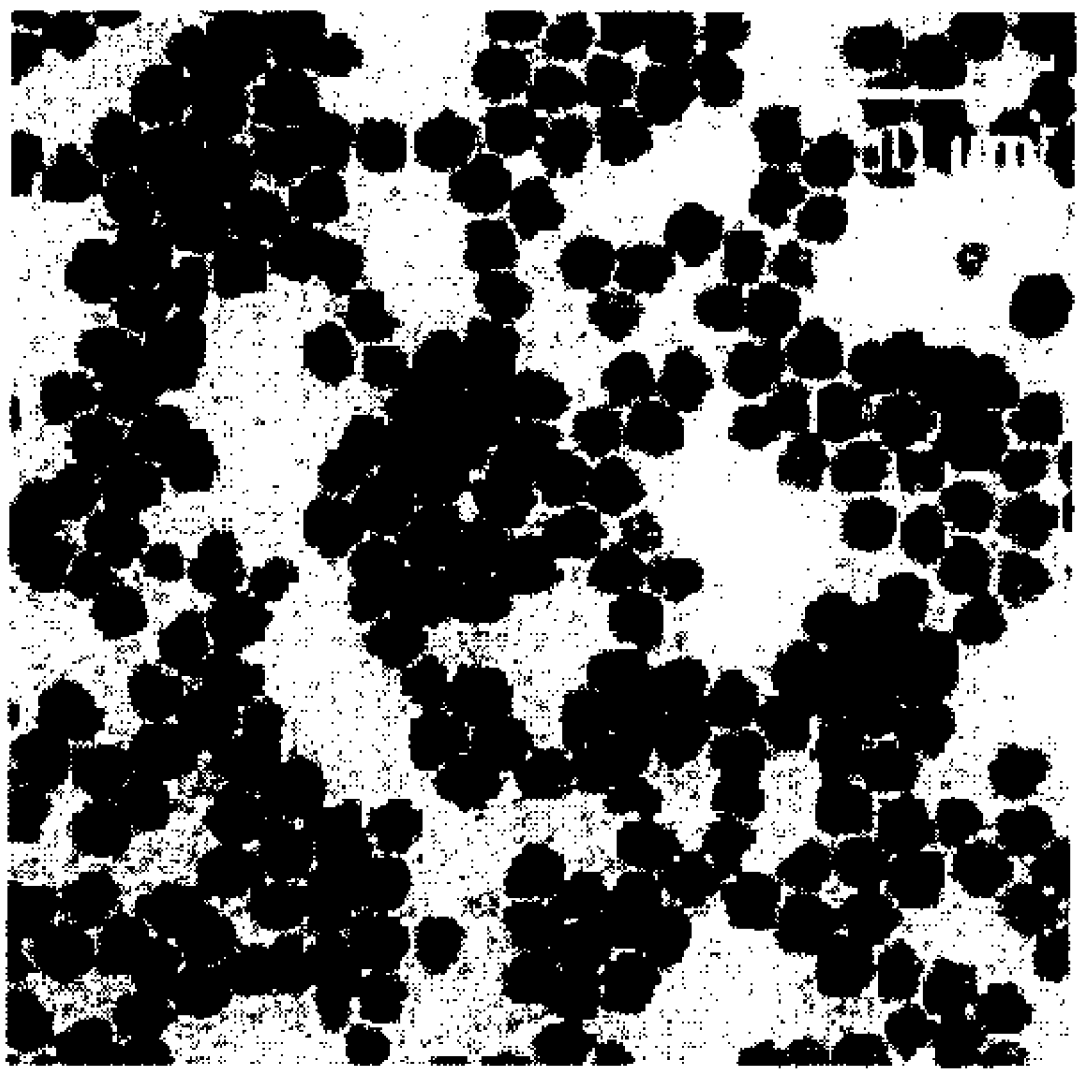

20 µl of solutions, which contain the iron oxide nanoparticles thus synthesized, were dropped on a carbon film-coated TEM grid (Ted pella Inc.), dried for about 30 min, and observed using an electron microscope (EF-TEM, Zeiss, acceleration voltage 100 kV). The results are shown in FIG. 2. FIGS. 2*a*, 2*b*, and 2*c* are TEM pictures of the iron oxide nanoparticles having sizes of 6, 9, and 12 nm which are produced according to the present invention. From these figures, it could be seen that the uniform iron oxide nanoparticles having the desired size were produced.

Example 2

Production of Manganese Ferrite ($MnFe_2O_4$) Nanoparticles

Iron nitrate (Aldrich) and manganese chloride (Aldrich) precursors were mixed in an equivalence ratio of 2:1, and reacted in 20 ml of an octyl ether solvent containing 0.1 M lauric acid and 0.1 M lauryl amine at 290° C. for 1 hour to produce manganese ferrite nanoparticles having the size of 6 nm. The manganese ferrite nanoparticles having sizes of 9 nm and 12 nm were synthesized through the same procedure as example 1 while the amount of solvent was controlled.

Figure 3A:
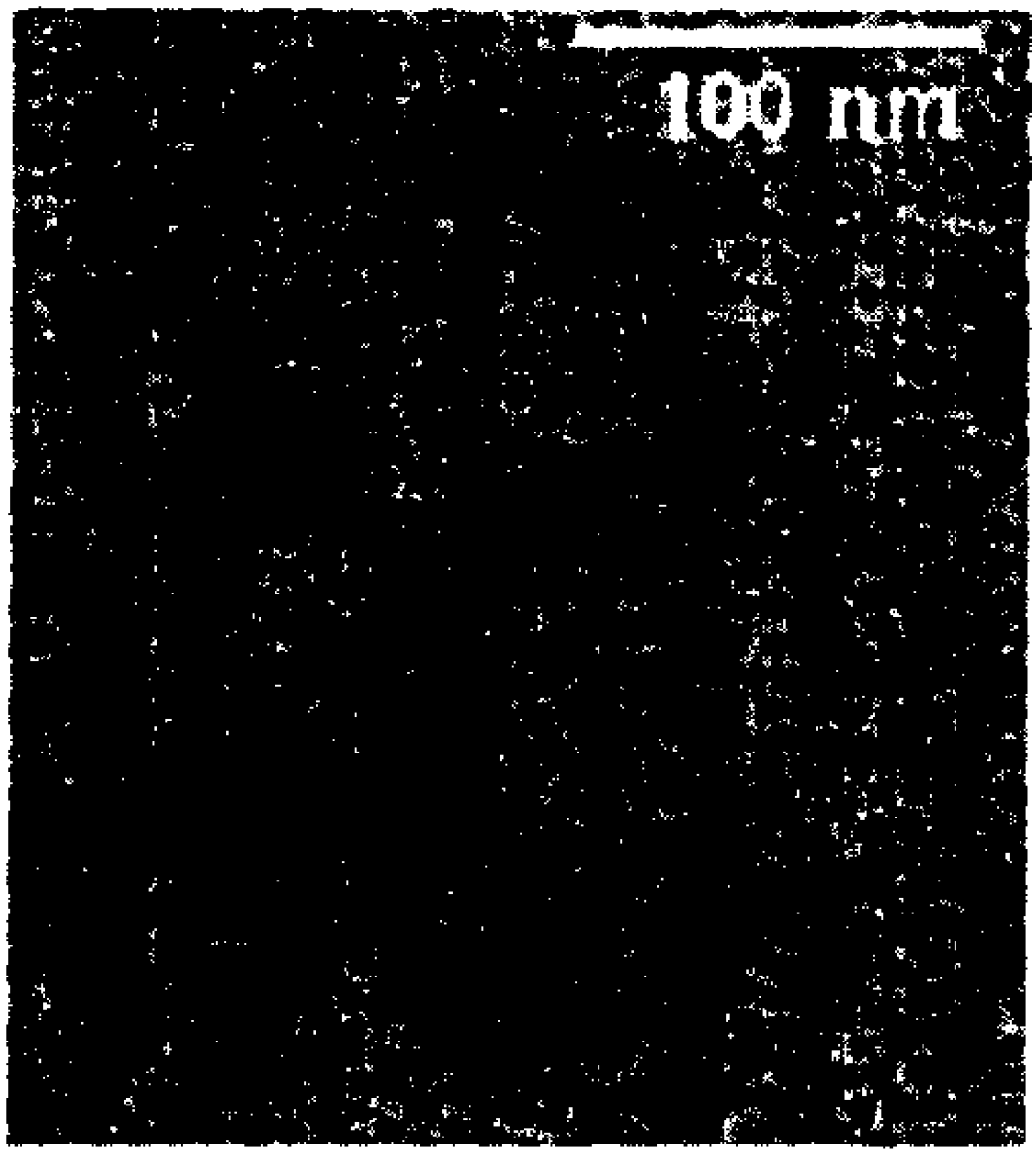
FIGS. 3a, 3b, and 3c are TEM pictures of manganese ferrite nanoparticles having sizes of 6, 9, and 12 nm produced according to the present invention.
Figure 3B:
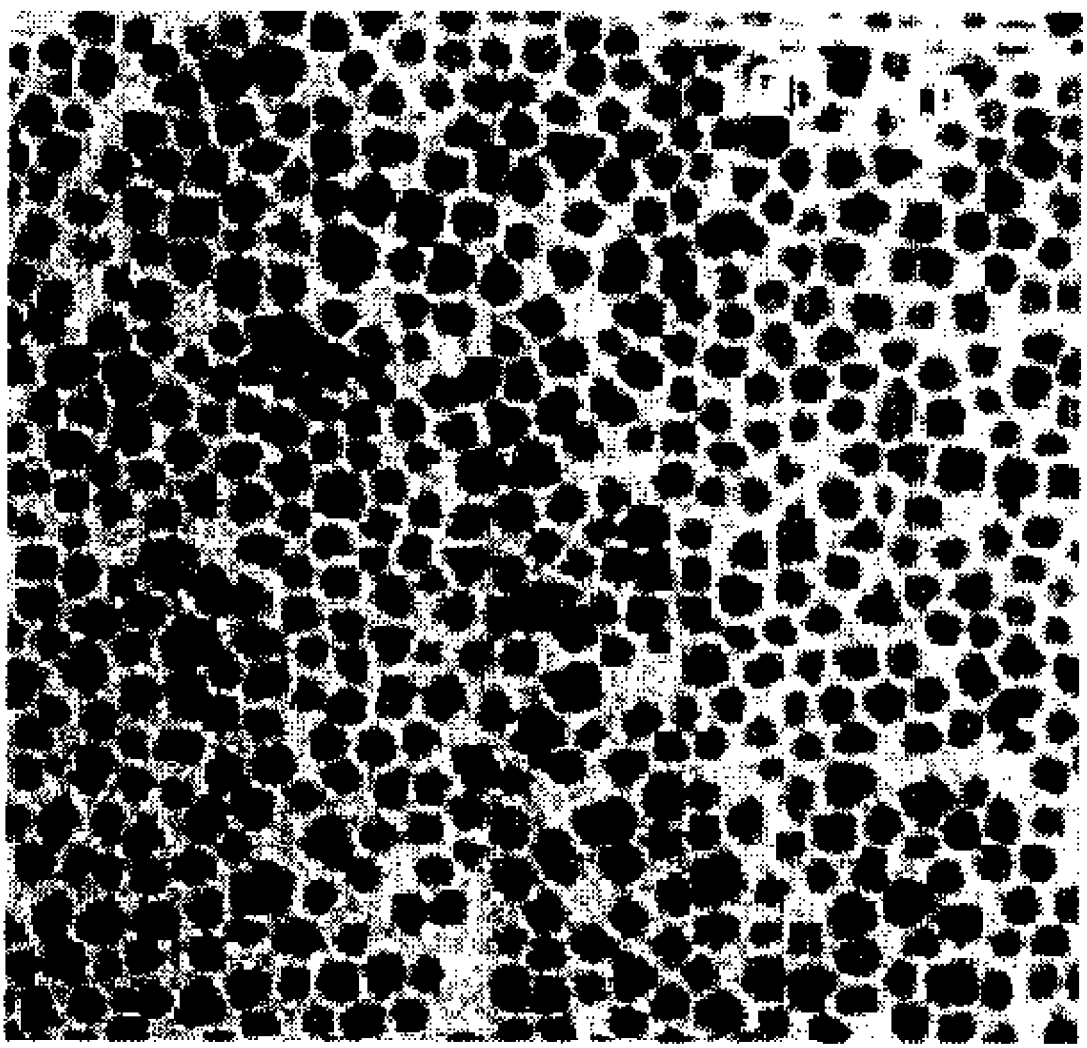
Figure 3C:
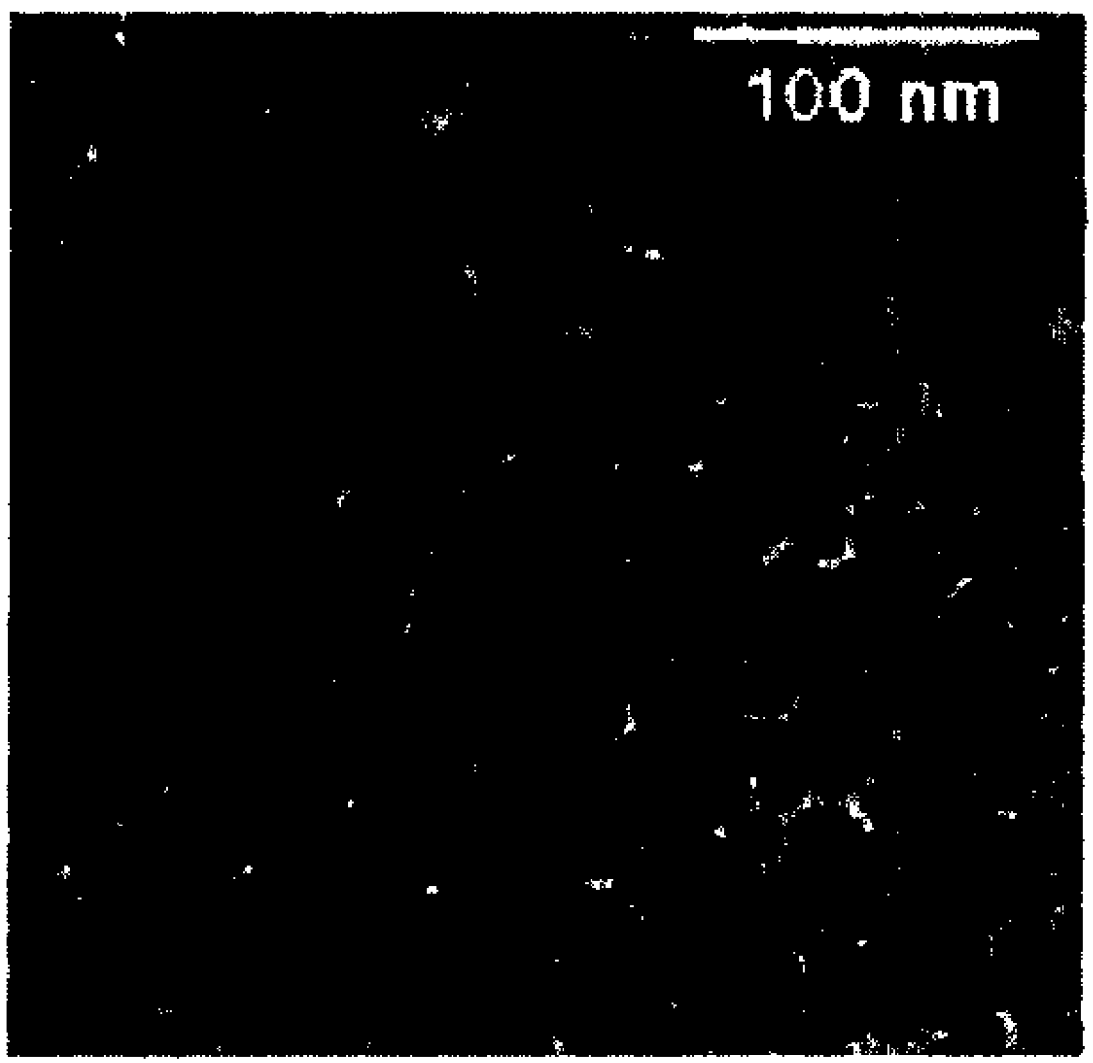

The synthesized manganese ferrite nanoparticles were observed using a TEM, and the results are shown in FIG. 3. FIGS. 3*a*, 3*b*, and 3*c* are TEM pictures of manganese ferrite nanoparticles having sizes of 6, 9, and 12 nm produced according to the present invention. From these figures, it could be seen that uniform manganese ferrite nanoparticles having the desired sizes were produced.

Figure 4:
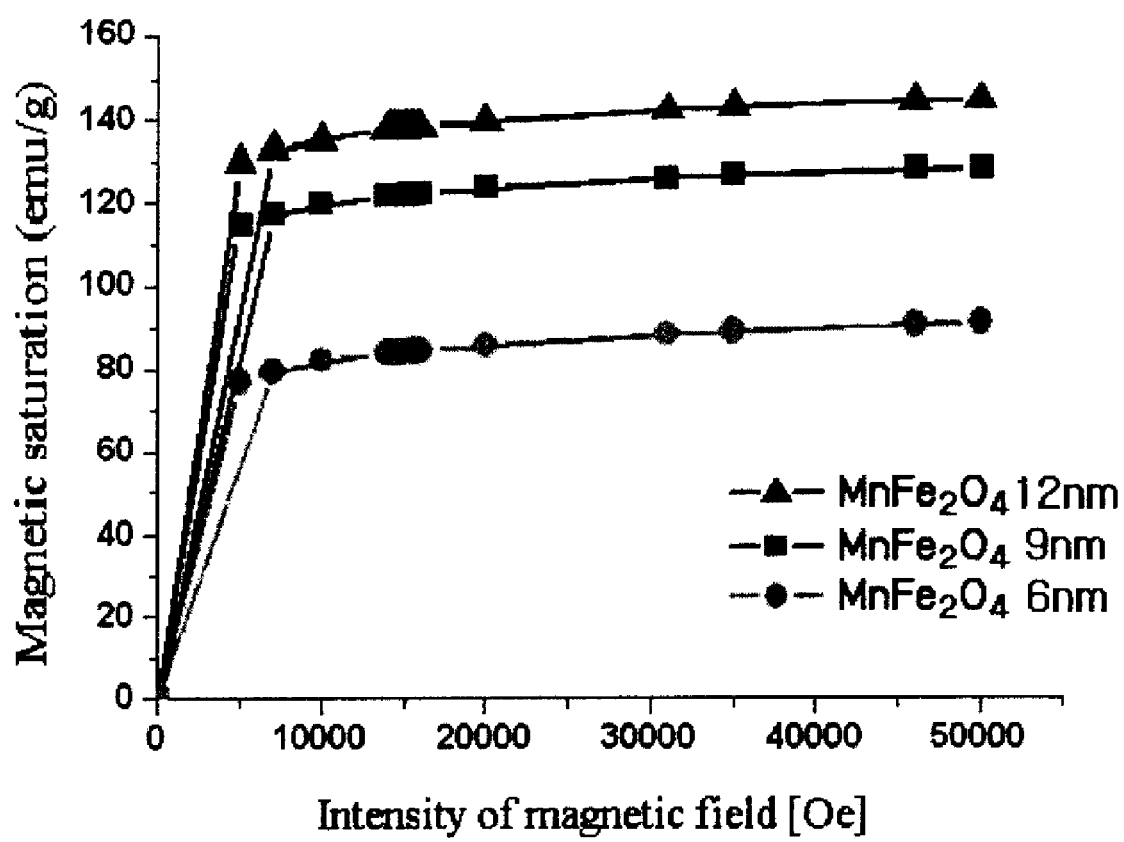
FIG. 4 illustrates saturation magnetic hysteresis curves of manganese ferrite nanoparticles having sizes of 6, 9, and 12 nm produced according to the present invention.

Saturation magnetic hysteresis depending on the size of the manganese ferrite nanoparticle was measured using a SQUID (superconducting quantum interferencing device, MPMS) at room temperature, and the results are shown in FIG. 4. From this figure, it can be seen that the higher size of the nanoparticle brings about higher magnetism in a saturation magnetic field.

Figure 5:
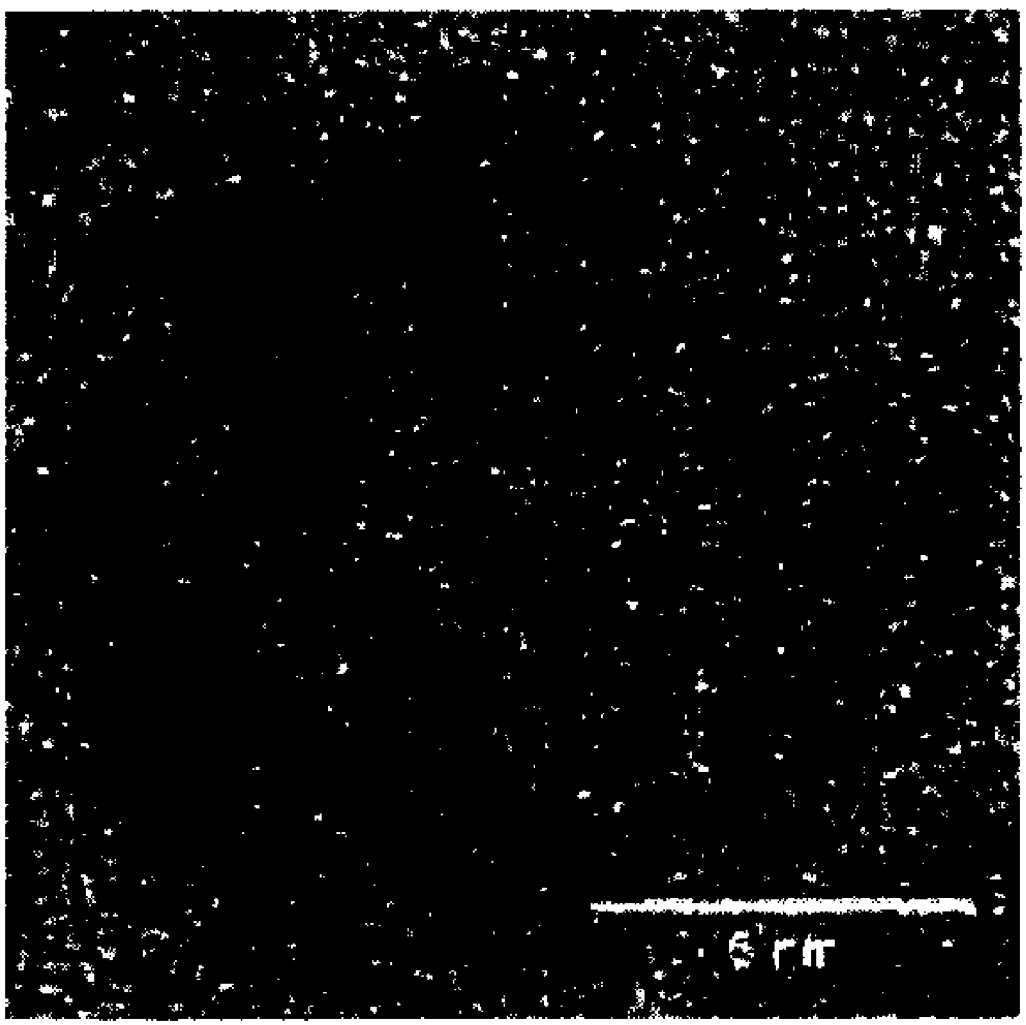
FIG. 5 is a high voltage high resolution TEM picture of manganese ferrite nanoparticles having sizes of 12 nm produced according to the present invention.

Furthermore, 20 µl of solutions, which contain the manganese ferrite nanoparticles, were dropped on a carbon film-coated TEM grid (Ted pella Inc.), dried for about 30 min, and observed using a high voltage high resolution TEM (Jeol, acceleration voltage 1250 kV). The results are shown in FIG. 5. It was confirmed that crystallinity of the manganese ferrite nanoparticles, was excellent and the nanoparticle had an inverse spinel structure.

Example 3

Production of Cobalt Ferrite Nanoparticles ($CoFe_2O_4$) and Nickel Ferrite Nanoparticles ($NiFe_2O_4$)

The procedure of example 2 was repeated except that cobalt chloride and nickel chloride precursors (Aldrich) were used in place of the manganese chloride precursor of example 2, thereby producing cobalt ferrite nanoparticles and nickel ferrite nanoparticles.

Figure 6:
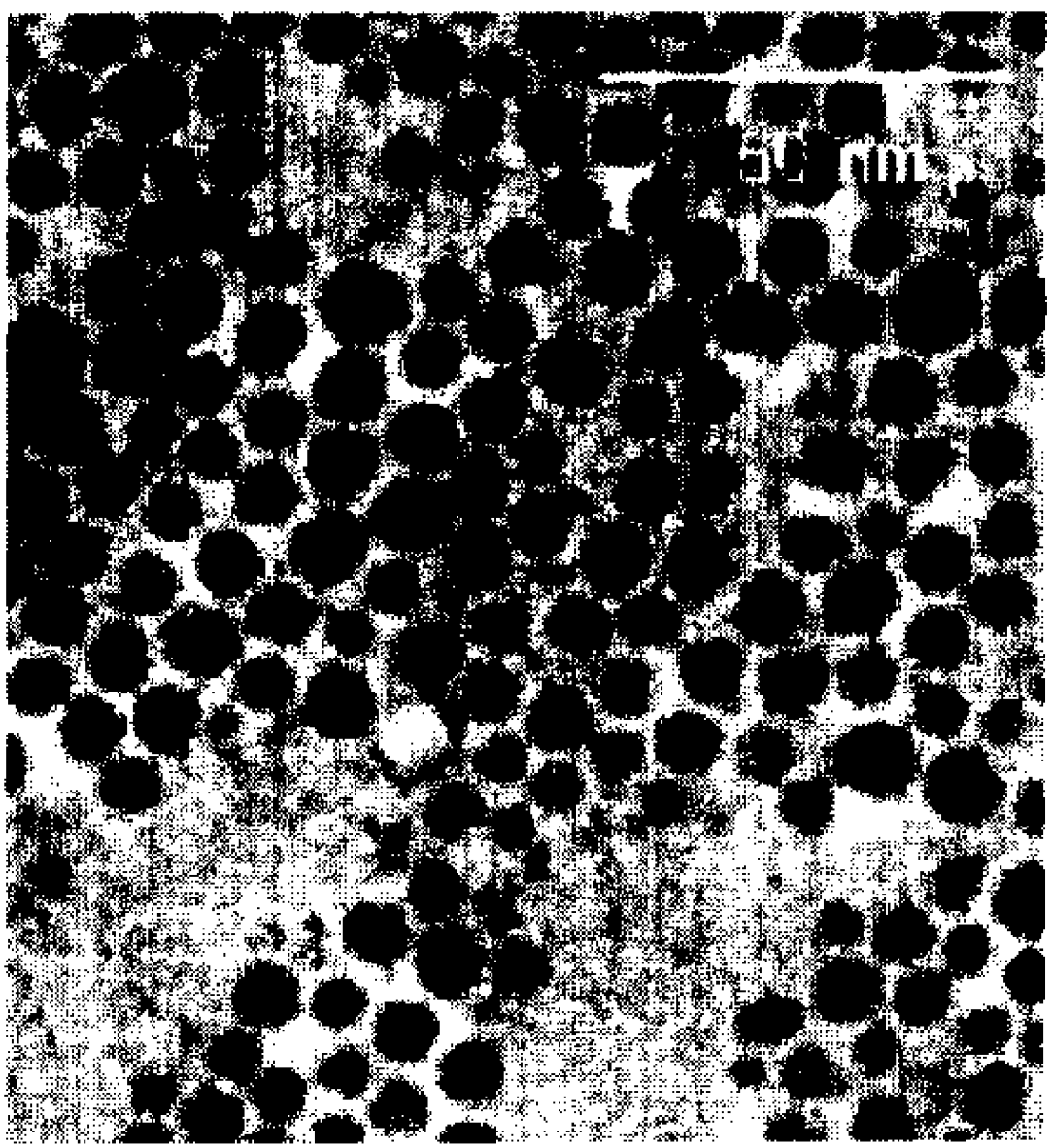
FIG. 6 is a TEM picture of cobalt ferrite nanoparticles produced according to the present invention.
Figure 7:
FIG. 7 is a TEM picture of nickel ferrite nanoparticles produced according to the present invention.

The synthesized cobalt ferrite nanoparticles and nickel ferrite nanoparticles were observed using a TEM, and the results are shown in FIGS. 6 and 7. From these figures, it can be seen that the sizes of the particles are uniformly distributed within 9±1 nm.

Example 4

Mass-Synthesis of Iron Oxide Nanoparticles

Iron oxide nanoparticles were synthesized in great quantity using 4 g of iron nitrate, which corresponded to an amount that was 10 times as much as the metal precursor of example 1, in 100 ml of an octyl ether solvent containing 1 M lauric acid and 1 M lauryl amine at 290° C.

Figure 8:
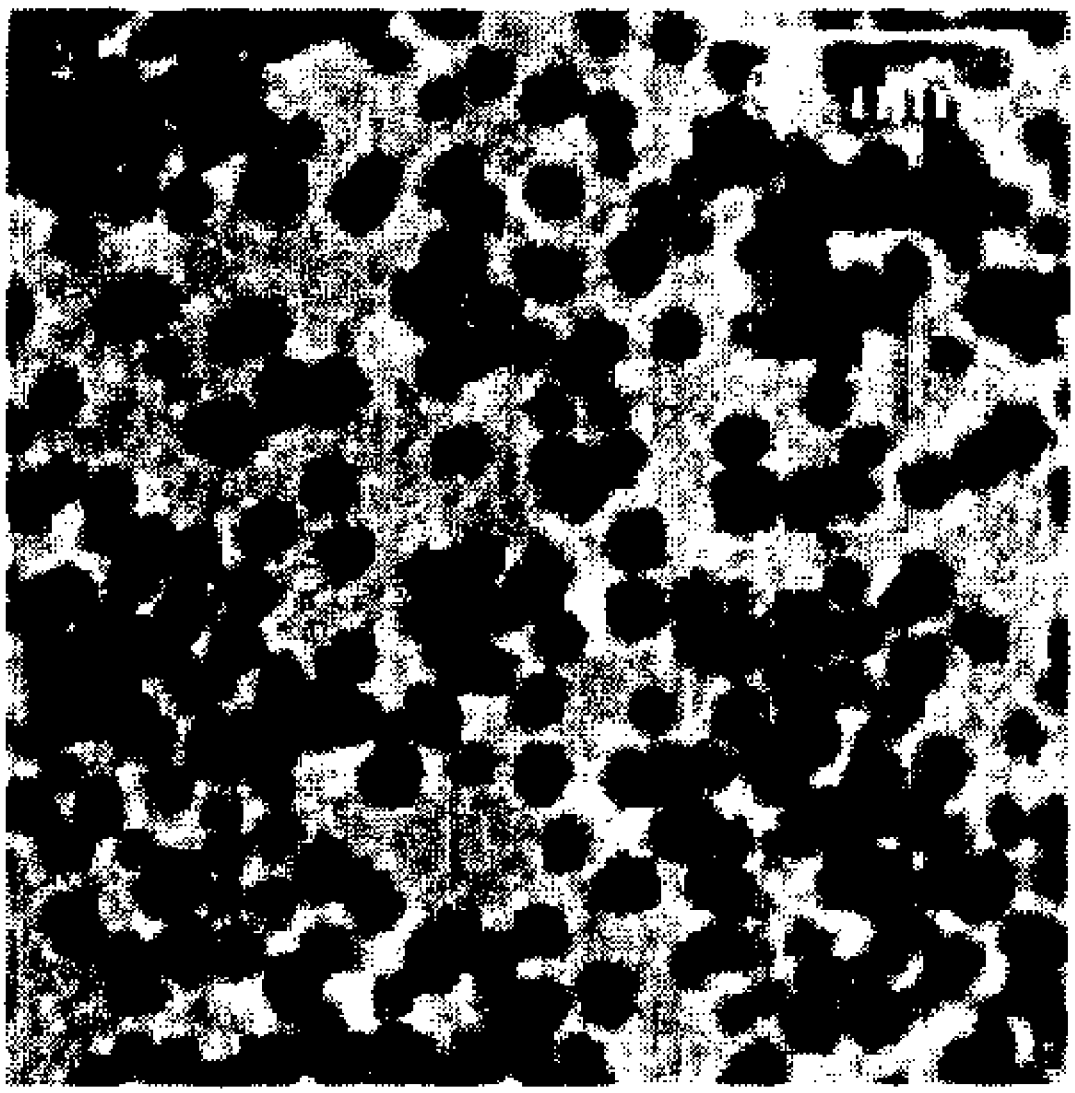
FIG. 8 is a TEM picture of iron oxide nanoparticles having the size of 9 nm which are mass-produced according to the present invention.

The synthesized iron oxide nanoparticles were observed using a TEM, and the results are shown in FIG. 8. From this figure, it can be seen that it is possible to produce iron oxide nanoparticles, which have excellent dispersibility and uniform size and shape, in great quantity.

Example 5

Synthesis of Titanium Oxide Nanoparticles 0.5 mmol of titanium tetrachloride (Aldrich) were mixed with 0.28 g of oleic acid (Aldrich) and 1.7 g of oleyl amine (Aldrich), and then decomposed by heating at 290° C. for 2 min to produce titanium oxide nanoparticles.

Figure 9:
FIG. 9 is a TEM picture of titanium oxide nanoparticles produced according to the present invention.

The synthesized titanium oxide nanoparticles were observed using a TEM, and the results are shown in FIG. 9. It was confirmed that uniform titanium oxide nanoparticles having diameters of 5 nm and lengths of 25-30 nm were produced.

Figure 10:
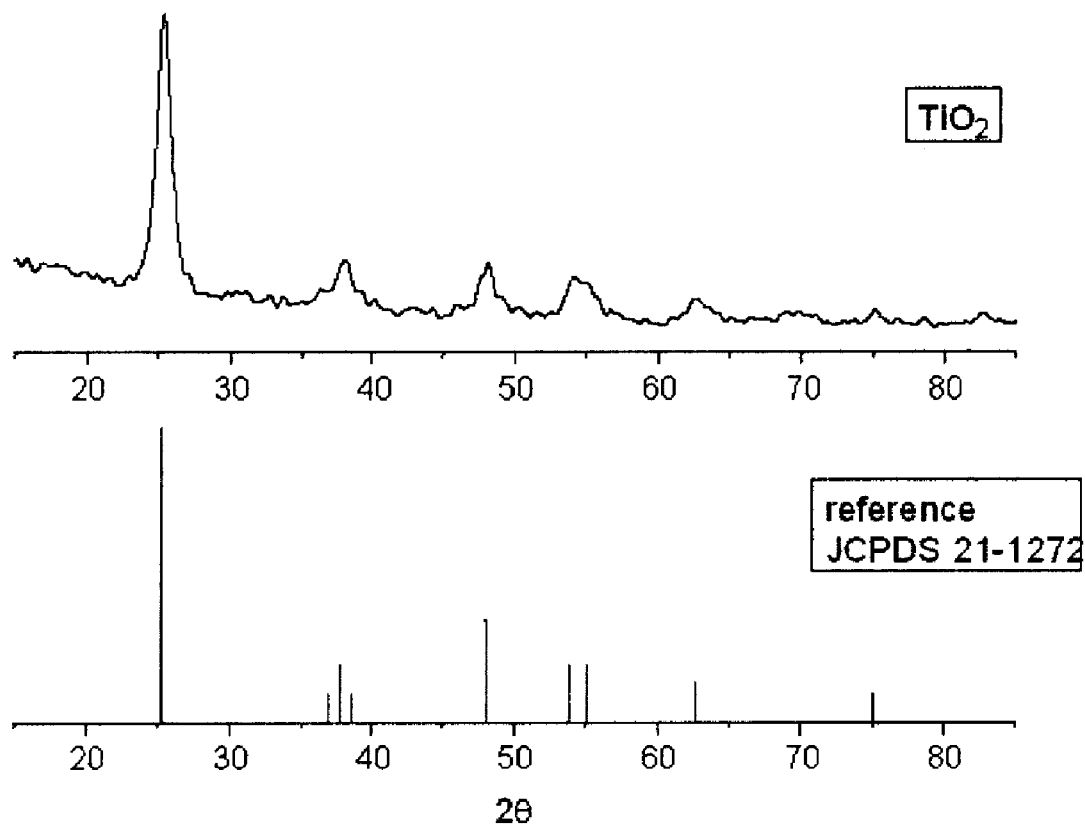
FIG. 10 illustrates X-ray diffraction pattern analysis results of titanium oxide nanoparticles produced according to the preset invention.

Furthermore, the titanium oxide nanoparticles dispersed on an organic solvent were condensed and dripped on a silicone substrate (1 cm×1 cm), and the solvent was vaporized. After this procedure was repeated, crystalline structures of the titanium oxide nanoparticles were analyzed using an X-ray diffraction analyzer (XRD, Rikagu), and the results are shown in FIG. 10. From this figure, it could be seen that crystallinity of the titanium oxide nanoparticle was excellent and the nanoparticle had an anatase structure.

Example 6

Synthesis of Tungsten Oxide Nanoparticles 0.1 mmole of tungsten tetrachloride (Aldrich) was mixed with 1.63 g of oleic acid and 0.54 g of oleyl amine, and then decomposed by heating at 350° C. for 1 hour to produce tungsten oxide nanoparticles.

Figure 11:
FIG. 11 is a TEM picture of tungsten oxide nanoparticles produced according to the present invention.

The synthesized tungsten oxide nanoparticles were observed using a TEM, and the results are shown in FIG. 11. From this figure, it was confirmed that crystals of the nanoparticles grew unidirectionally.

Figure 12:
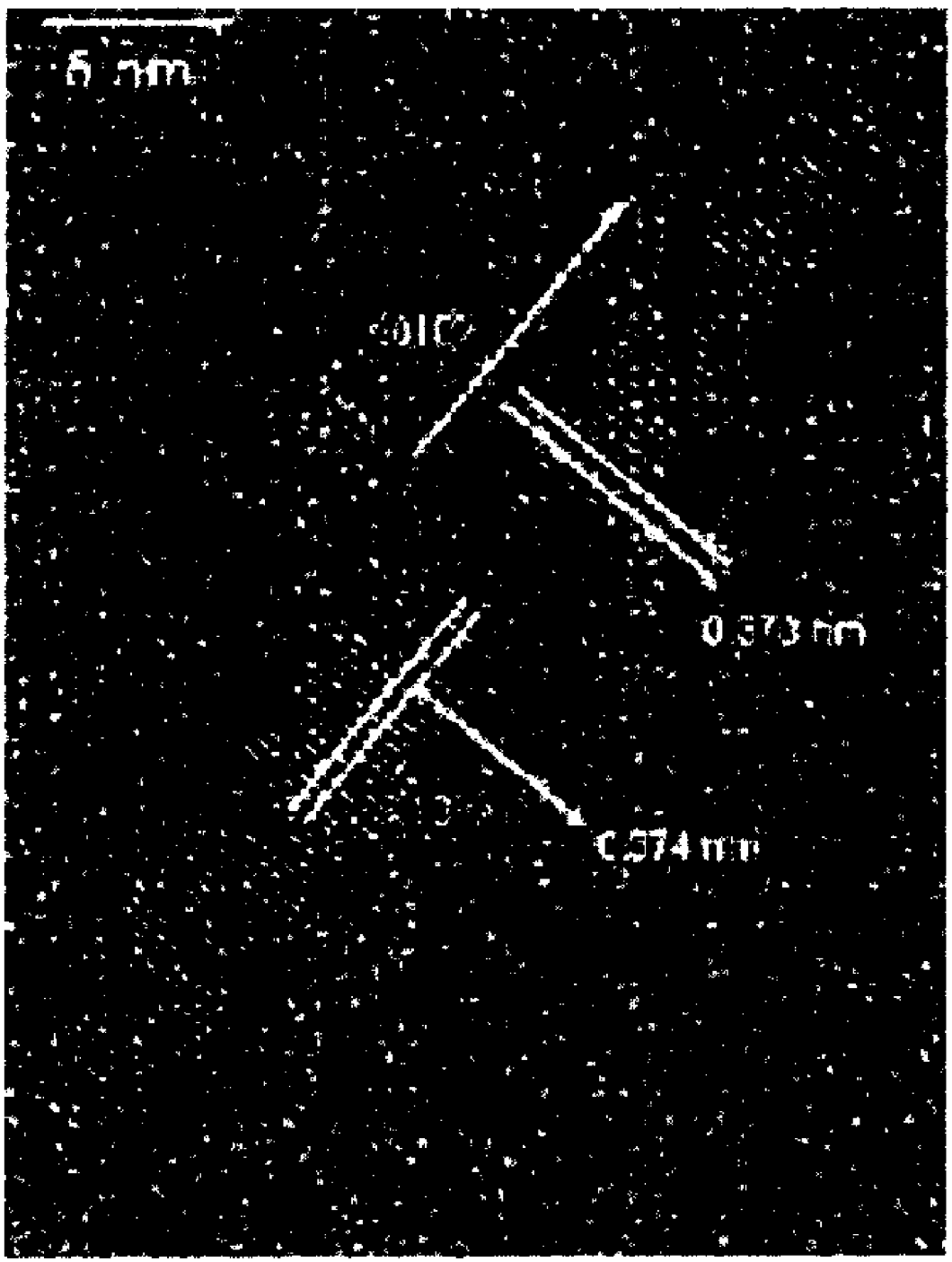
FIG. 12 is a high voltage high resolution TEM picture of tungsten oxide nanoparticles produced according to the present invention.

Furthermore, the tungsten oxide nanoparticles were observed using a high voltage high resolution TEM, and the results are shown in FIG. 12. It could be seen that the crystallinity of the tungsten oxide nanoparticle was excellent and the preferred orientation of crystal growth of the nanoparticles toward <010> was achieved.

Example 7

Synthesis of Manganese Oxide Nanoparticles 0.5 mmole of manganese chloride (Aldrich) was mixed with 0.28 g of oleic acid and 1.64 g of oleyl amine, and then decomposed by heating at 270° C. for 20 min to produce manganese oxide nanoparticles.

Figure 13:
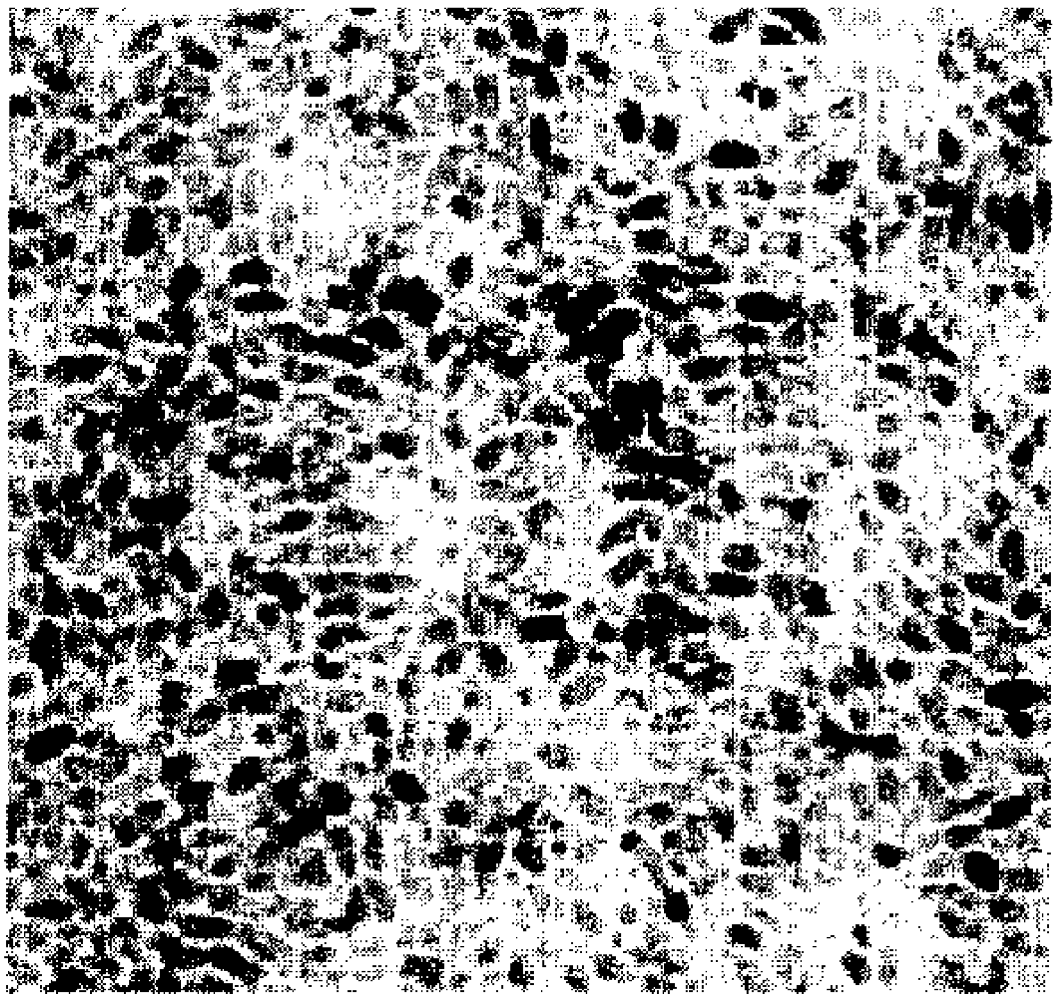
FIG. 13 is a TEM picture of manganese oxide nanoparticles produced according to the present invention.

The synthesized manganese oxide nanoparticles were observed using a TEM, and the results are shown in FIG. 13. From the TEM analysis results, it was confirmed that the manganese oxide nanoparticles had a millet shape, and diameters and lengths of the nanoparticles were uniform.

Figure 14:
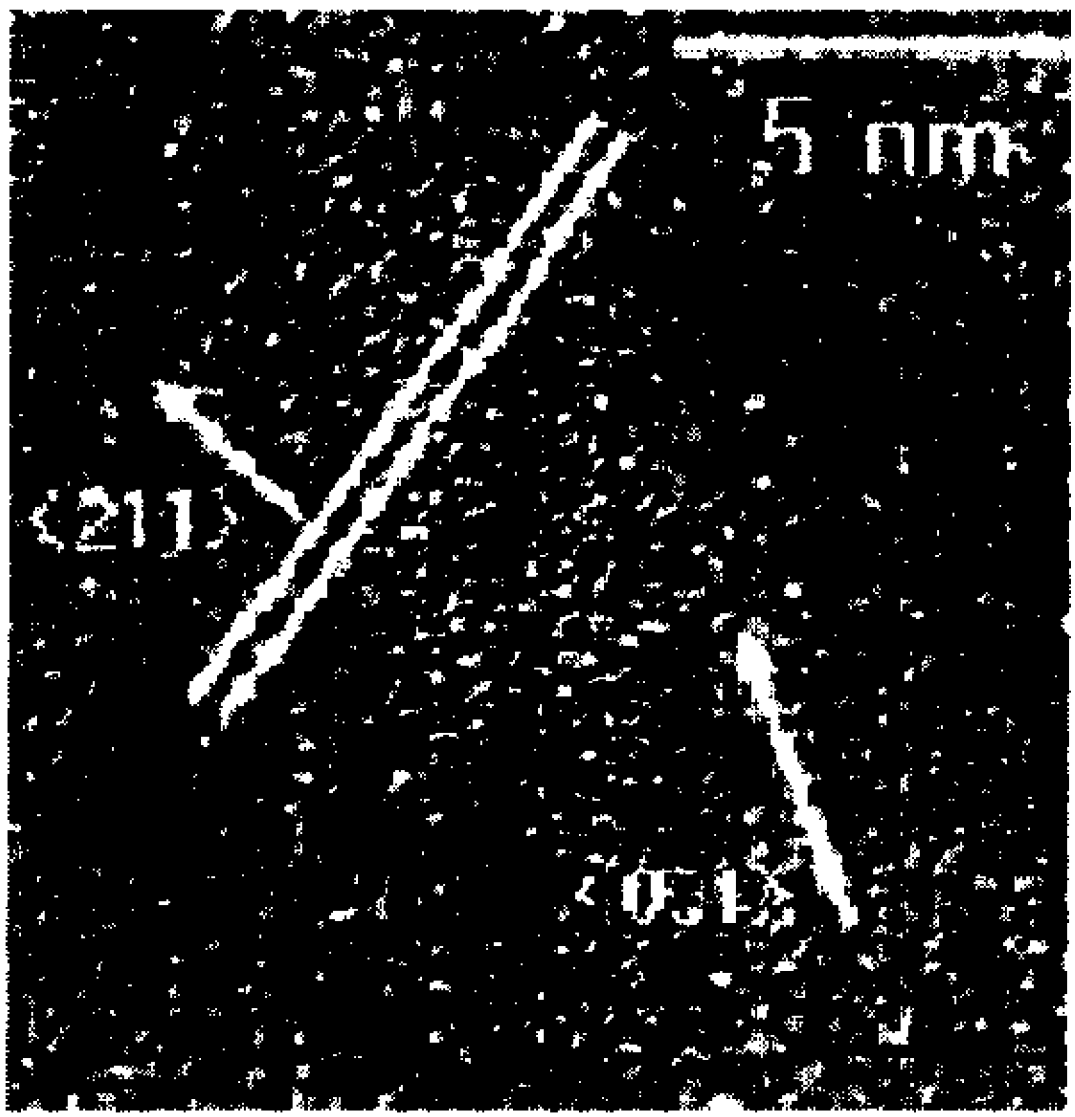
FIG. 14 is a high voltage high resolution TEM picture of manganese oxide nanoparticles produced according to the present invention.

Furthermore, the manganese oxide nanoparticles were observed using a high voltage high resolution TEM, and the results are shown in FIG. 14. It could be seen that the crystallinity of the manganese oxide nanoparticles was excellent, the preferred orientation of crystal growth of the nanoparticles toward <001> was achieved and the crystals of the nanoparticles were partially grown toward <211>.

Figure 15:
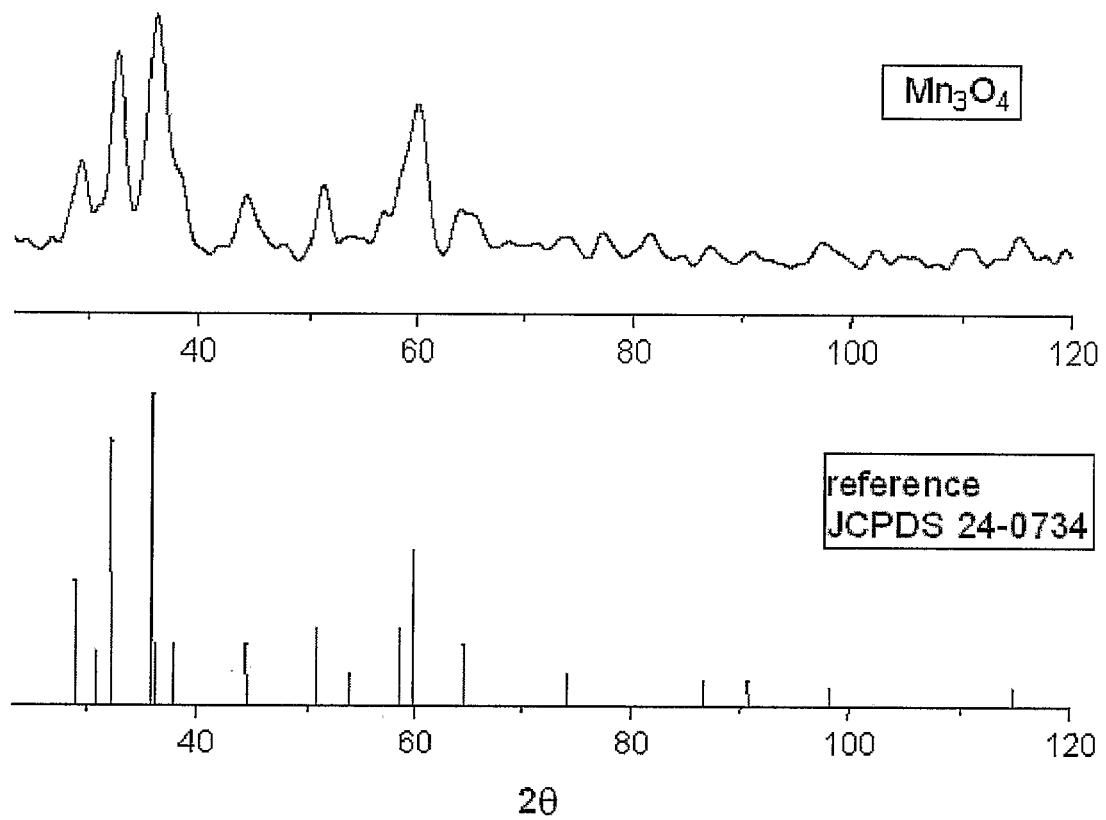
FIG. 15 illustrates X-ray diffraction pattern analysis results of manganese oxide nanoparticles produced according to the present invention.

Additionally, the manganese oxide nanoparticles were subjected to X-ray diffraction pattern analysis, and the results are shown in FIG. 15. It could be seen that the structure of the manganese oxide nanoparticle was tetragonal and the crystallinity was excellent.

INDUSTRIAL APPLICABILITY

According to a method of the present invention, it is possible to mass-produce magnetic or metal oxide nanoparticles without an oxidizing agent or a reducing agent, and to uniformly produce the magnetic or metal oxide nanoparticles having the desired size by controlling a precursor concentration or a surfactant.

The invention claimed is:

1. A method of producing magnetic oxide nanoparticles without using an oxidizing or a reducing agent, comprising:
    (1) adding a magnetic precursor to a surfactant or a solvent containing the surfactant to produce a mixed solution;
    (2) heating the mixed solution to 50-600° C. to decompose the magnetic precursor by heating so as to form the magnetic oxide nanoparticles or metal oxide nanoparticles; and
    (3) separating the magnetic oxide nanoparticles, wherein the surfactant is a mixture of organic acid and organic amine, where said organic acid is $C_nCOOH$, and said organic amine is $C_nNH_2$, wherein $C_n$ is hydrocarbon, and $7 \leq n \leq 30$.

2. The method as set forth in claim 1, wherein the magnetic precursor is selected from the group consisting of a metal nitrate-based compound, a metal sulfate-based compound, a metal fluoroacetoacetate-based compound, a metal halide-based compound, a metal perchlorate-based compound, a metal sulfamate-based compound, a metal stearate-based compound, and an organometallic compound.

3. The method as set forth in claim 2, wherein the metal nitrate-based compound is selected from the group consisting of iron(II) nitrate, iron(III) nitrate, manganese nitrate, cobalt nitrate, zinc nitrate, nickel nitrate, and copper nitrate.

4. The method as set forth in claim 2, wherein the metal sulfate-based compound is selected from the group consisting of iron sulfate (II), iron sulfate (III), manganese sulfate, cobalt sulfate, nickel sulfate, copper sulfate, and zinc sulfate.

5. The method as set forth in claim 2, wherein the metal fluoroacetoacetate-based compound is selected from the group consisting of iron trifluoroacetoacetate, cobalt hexafluoroacetoacetate, manganese hexafluoroacetoacetate, nickel hexafluoroacetoacetate, copper hexafluoroacetoacetate, and zinc hexafluoroacetoacetate.

6. The method as set forth in claim 2, wherein the metal halide-based compound is selected from the group consisting of iron(II) chloride, iron(III) chloride, cobalt chloride, nickel chloride, copper chloride, zinc chloride, gadolinium chloride, iron(II) bromide, iron(III) bromide, cobalt bromide, nickel bromide, copper bromide, zinc bromide, iron(II) iodide, iron(III) iodide, manganese iodide, nickel iodide, copper iodide, zinc iodide, and cobalt iodide.

7. The method as set forth in claim 2, wherein the metal perchlorate-based compound is selected from the group consisting of iron(III) perchlorate, cobalt perchlorate, manganese perchlorate, nickel perchlorate, copper perchlorate, and zinc perchlorate.

8. The method as set forth in claim 2, wherein the metal sulfamate-based compound is selected from the group consisting of iron sulfamate, manganese sulfamate, nickel sulfamate, cobalt sulfamate, copper sulfamate, and zinc sulfamate.

9. The method as set forth in claim 2, wherein the metal stearate-based compound is selected from the group consisting of iron stearate, manganese stearate, nickel stearate, copper stearate, cobalt stearate, and zinc stearate.

10. The method as set forth in claim 2, wherein the organometallic compound is selected from the group consisting of iron(III) meso tetraphenylporphin oxo dimer, tris(2,2,6,6,-tetramethyl-3,5-heptanedionate)iron(III), bis(2,2,6,6-tetramethyl-3,5-heptanedionate)nickel, bis(2,2,6,6-tetramethyl-3,5-heptanedionate)cobalt, bis(2,2,6,6-tetramethyl-3,5-heptanedionate)copper, bis(2,2,6,6-tetramethyl-3,5-heptanedionate)zinc, and bis(2,2,6,6-tetramethyl-3,5-heptanedionate)manganese.

11. The method as set forth in claim 1, wherein the organic acid is selected from the group consisting of oleic acid, lauric acid, stearic acid, mysteric acid, and hexadecanoic acid.

12. The method as set forth in claim 1, wherein the organic amine is selected from the group consisting of oleyl amine, lauryl amine, and hexadecyl amine.

13. The method as set forth in claim 1, wherein the solvent is selected from the group consisting of an ether-based compound; hydrocarbon; a mixture of organic acid and organic amine; and alkane thiol
    wherein an ether-based compound is $C_{n2}O$, where $C_n$ is hydrocarbon, and $5 \leq n \leq 30$; hydrocarbon is $C_n$, and $7 \leq n \leq 30$; organic acid is $C_nCOOH$, where $C_n$ is hydrocarbon, and $7 \leq n \leq 30$; organic amine is $C_nNH_2$, where $C_n$ is hydrocarbon, and $7 \leq n \leq 30$; and alkane thiol is $C_nSH$, where $C_n$ is hydrocarbon, and $7 \leq n \leq 30$.

14. The method as set forth in claim 13, wherein the ether-based compound is selected from the group consisting of octyl ether, benzyl ether, and phenyl ether.

15. The method as set forth in claim 13, wherein the hydrocarbon is selected from the group consisting of hexadecane, heptadecane, and octadecane.

16. The method as set forth in claim 13, wherein the organic acid is selected from the group consisting of oleic acid, lauric acid, stearic acid, mysteric acid, and hexadecanoic acid.

17. The method as set forth in claim 13, wherein the organic amine is selected from the group consisting of oleyl amine, and hexadecyl amine.

18. The method as set forth in claim 13, wherein the alkane thiol is selected from the group consisting of dodecane thiol hexadecane thiol, and heptadecane thiol.

19. The method as set forth in claim 1, wherein the surfactant is contained in the mixed solution in an amount that is 1-100 times the amount of the magnetic precursor.

20. The method as set forth in claim 1, wherein the solvent is contained in the mixed solution in an amount that is 1-100 times the amount of the magnetic precursor.

21. The method as set forth in claim 1, wherein the mixed solution containing the magnetic precursor is heated at 50-600° C. for 30 min-3 hours.

22. The method as set forth in claim 1, wherein the mixed solution containing the metal precursor is heated at 50-600° C. for 1 min-2 hours.

23. The method as set forth in claim 1, wherein sizes of the magnetic oxide nanoparticles are controlled by adjusting a concentration of the magnetic precursor.

24. A method of producing magnetic oxide nanoparticles without using an oxidizing or a reducing agent comprising:

(1) adding a magnetic precursor to a surfactant or a solvent containing the surfactant to produce a mixed solution;
(2) heating the mixed solution to 50-600° C. to decompose the magnetic precursor by heating so as to form the magnetic oxide nanoparticles; and
(3) separating the magnetic oxide nanoparticles, wherein the surfactant is a mixture of organic acid and organic amine, where said organic acid is $C_nCOOH$, and said organic amine is $C_nNH_2$, wherein $C_n$ is hydrocarbon, and $7 \leq n \leq 30$, and wherein diameters of the magnetic oxide nanoparticles are controlled by adjusting a composition ratio of surfactants.

25. The method as set forth in claim 1, wherein the magnetic oxide nanoparticles include single component magnetic oxide nanoparticles or composite magnetic oxide nanoparticles.

26. The method as set forth in claim 25, wherein the single component magnetic oxide nanoparticles include $M_xO_y$, wherein M is Fe, Ni, Co, Gd, Mn, Zn, Cr, or Cu; $0<x \leq 3$; and $0<y \leq 4$.

27. The method as set forth in claim 25, wherein the composite magnetic oxide nanoparticles include $MM'_2O_4$, wherein M and M' are independently Fe, Co, Ni, Mn, Zn, Gd, or Cr.

* * * * *